Figure 2:
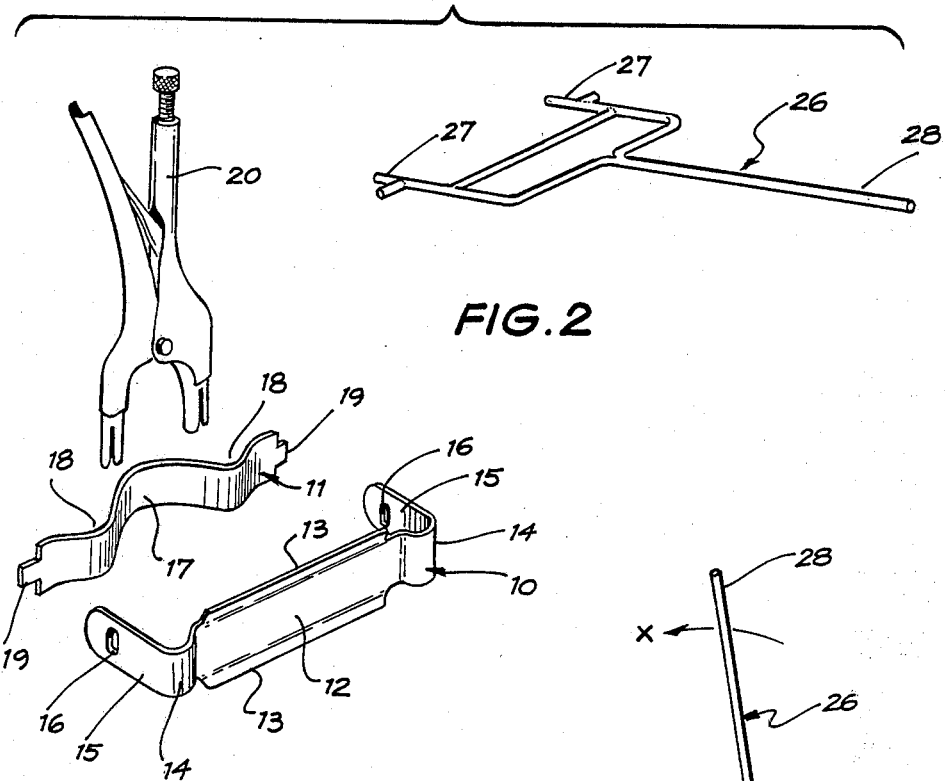

United States Patent [19]

Miljoen

[11] 4,323,378
[45] Apr. 6, 1982

[54] CLAMPING MEANS

[75] Inventor: Rodney W. Miljoen, Berowra Waters, Australia

[73] Assignee: James Howden Australia Pty. Limited, Australia

[21] Appl. No.: 181,703

[22] Filed: Aug. 27, 1980

[30] Foreign Application Priority Data

Aug. 27, 1979 [AU] Australia .............................. PE0215

[51] Int. Cl.³ ...................... B01D 46/02; A44B 21/00
[52] U.S. Cl. ................................. 55/378; 24/30.5 R; 24/263 SB
[58] Field of Search ................ 55/147, 148, 378, 379, 55/507–509; 210/323.2; 24/30.5 R, 263 SB

[56] References Cited

U.S. PATENT DOCUMENTS 1,459,445 6/1923 Elderton et al. ............... 24/263 SB
3,097,939 7/1963 Schineider et al. .................. 55/378

FOREIGN PATENT DOCUMENTS 861075 2/1961 United Kingdom .................. 55/379

*Primary Examiner*—David L. Lacey

[57] ABSTRACT

Clamping means for clamping an end of a fabric filter bag to a supporting frame member comprising a U-shaped clamping member the bight portion of which forms a clamping portion lying on one side of the frame member while the arms project through apertures in the frame member, and a leaf spring engaged with the arms of the clamping member and bearing against the other side of the frame member such that the clamping portion of the clamping member is urged towards the one side of the frame member. This arrangement renders replacement or retensioning of a bag easier and prevents bag failure by reducing the stresses applied to the fibers of the bag while clamped in place.

5 Claims, 2 Drawing Figures

CLAMPING MEANS

The present invention relates to clamping means for clamping an end of a fabric filter bag to a support frame member and more particularly to such clamping means which include spring biasing means to urge a clamping member into engagement with a frame member to clamp in place a bag disposed between the clamping member and the frame member.

Fabric filters are used to filter particulate matter from gas streams. Fabric filters incorporating fabric filter bags are generally used to filter such particulate matter from large volume gas streams such as the exhaust gas streams on boilers. Such fabric filter bags are generally suspended from a frame with the closed end uppermost and the gas stream is passed into the lower, open, end of the bag and particulate matter is filtered from the gas stream as it passes through the fabric of the bag. Such bags are periodically cleaned by a known procedure such as shaking the bag or reversing the direction of flow of the air. It is essential that the bag be clamped to the frame member in such a way that it may be readily removed from the frame or, if the bag stretches, such that it may be retensioned. It is also important that the method of clamping does not impose undue stress on the fibres of the bag in the area of the clamp if bag failure is to be avoided.

In the past a common method of fixing such bags to the supporting frame is by the use of a pair of parallel bars connected to the frame and so arranged that the tail of the bag may be threaded around the bars in such a way that the bag overlaps itself and is held in place by the tail of the bag being jammed between one of the bars and the overlapping bag portion.

The present invention is designed to provide an improved clamping means for clamping an end of the fabric filter bag to a supporting frame which will provide firm clamping of the bag to the frame and which will allow retensioning of the fabric filter bag from time to time even where only slight upward movement of the bag is required. The arrangement according to the present invention also expedites the installation, tensioning and retensioning of the bag and because of the large cloth to clamp contact surface the present arrangement reduces fibre stress and hence potential bag failure in the region of the clamp.

The present invention consists in clamping means for clamping an end of a fabric filter bag to a supporting frame member, comprising a substantially U-shaped clamping member, the bight portion of which forms a clamping portion lying on one side of the said frame member while the arms of the clamping member project through apertures in the frame member, and a leaf spring engaged with the arms of the clamping member and bearing against the other side of the said frame member such that the clamping portion of the clamping member is urged towards the one side of the frame member.

The U-shaped clamping member is preferably formed of mild steel and the bight portion is preferably provided with a substantially planar clamping portion, the lateral free edges of which are flanged off outwardly to avoid rubbing contact between the free edges and a bag clamped between the clamping member and the supporting frame member. The clamping portion is preferably flanked at each end by upwardly bowed portions which terminate in an arm of the clamping member.

The outwardly bowed portions serve to provide a space between the bight of the clamping member and the supporting frame member even when the clamping portion of the clamping member is in contact with the said one side of the frame member. The presence of these spaces allows a lever to be positioned in the spaces to lever the clamping portion away from the one side of the frame member to allow the insertion of an end of a fabric filter bag therebetween or to allow a previously positioned filter bag to be retensioned. The arms of the clamping member are each preferably provided with a hole adjacent their free ends to receive a tongue which projects outwardly from the free ends of the leaf spring.

The leaf spring is preferably formed with a central bight portion which bears against the said other side of the frame member and a pair of tongues at its free ends which extend into apertures in the arms of the U-shaped clamping member. In a particularly preferred arrangement the leaf spring has a substantially "W" shape while still terminating in a pair of tabs. In this arrangement the central bight portion is directed away from the said other side of the frame member which is contacted by the two bight portions disposed between the central bight portion and the free end tab.

Figure 1:
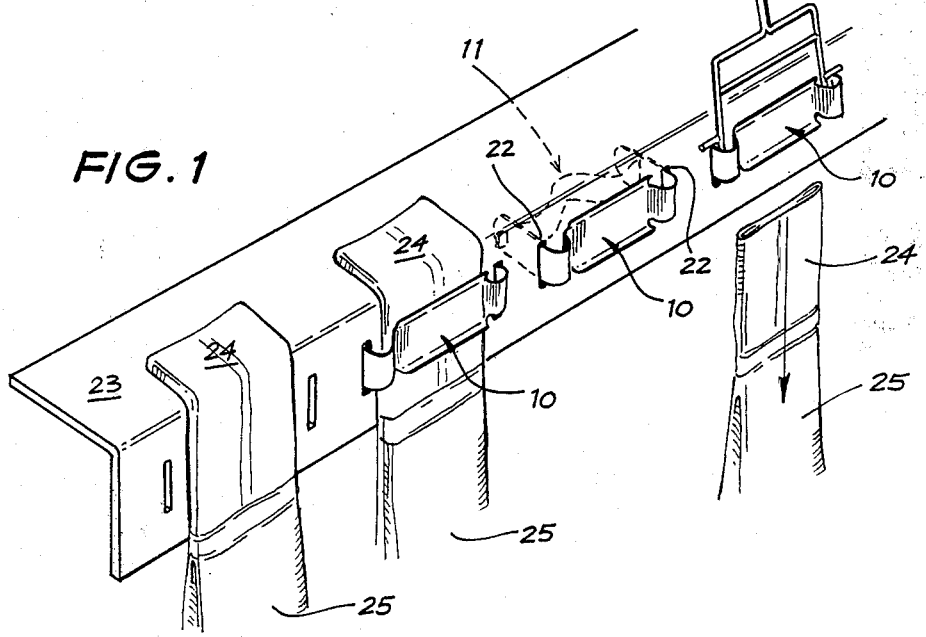

Hereinafter given by way of example only is a preferred embodiment of the present invention described with reference to the accompanying drawings in which:

FIG. 1 is a perspective view of a row of clamping means according to the invention, and FIG. 2 is a perspective view of a U-shaped clamping member and a leaf spring for use in clamping means according to this invention together with perspective views of two tools particularly adapted for use with the clamping means according to this invention.

The clamping means comprises a substantially U-shaped clamping member 10 and a leaf spring 11. The clamping member 10 comprises a planar clamping portion 12 which is provided along each lateral edge with an outwardly turned flange 13. At either end of the clamping portion 12 is a bight 14. Each bight 14 connects together the clamping portion 12 with an arm 15 of the clamping member 10. An aperture 16 is provided adjacent the free end of each of the arms 15. The clamping member is formed of mild steel.

The leaf spring 11 has an essentially "W" shape comprising a central bight portion 17 flanked by a pair of lateral bight portions 18 which are curved in an opposite sense to the central bight portion 17. A tab 19 is provided at each end of the leaf spring 11 and are dimensioned to fit within the apertures 16 in the arms 15 of the clamping member 10.

The tool 20 shown in FIG. 2 is used to grip the leaf spring 11 on either side of the central bight portion 17 and to compress the spring such that the tabs 19 can be inserted into the apertures 16 of the clamping member 10.

In use the arms 15 of the clamping member 10 are inserted through holes 22 in an L-section beam 23 which forms part of the frame of a shaker rack used in a fabric filter bag house. The tool 20 is then used to compress the leaf spring 11 and to insert the tabs 19 of the leaf spring into the apertures 16 of the clamping member 10. The spring urges the free ends of the arms 15 away from the beam 23 and forces the clamping portion 12 of the clamping member 10 into engagement with the adjacent face of the beam 23. To insert the tail end 24 of a fabric filter bag 25 between the clamping member 10 and the beam 23 the lever tool 26 is positioned such that the tangs 27 project into the bights 24 on either side of the clamping portion 12 of the clamping member 10 and the handle portion 28 of the tool moved in the direction "X" as seen in FIG. 1 to lever the clamping portion away from the beam 23 against the effect of the spring 11. Similarly if it is desired to adjust the tension in a bag 25 it is possible to release the pressure on the clamping portion 12 by the use of the tool 26 and to then raise or lower the tail end 24 of the bag 25 to adjust the tension in the bag.

I claim:

1. Clamping means for clamping an end of a fabric filter bag to a supporting frame member having apertures, comprising a substantially U-shaped clamping member, the bight portion of which forms a clamping portion adapted to lie on one side of the frame member while the arms of the clamping member project through the apertures in the frame member, and a leaf spring constructed such that it is adapted to engage with the arms of the clamping member and to bear against the other side of the said frame member such that the clamping portion of the clamping member is urged towards the one side of the frame member.

2. Clamping means as claimed in claim 1 in which the bight portion of the clamping member has intermediate its ends a planar zone adapted to be urged into juxtaposition with a face of the frame member by the leaf spring.

3. Clamping means as claimed in claim 2 in which the bight portion of the clamping member includes on either side of the planar zone an outwardly bowed zone, each of which outwardly bowed zones terminates at its end distal to the planar zone in an arm of the clamping member.

4. Clamping means as claimed in any one of claims 1, 2 or 3 in which the arms of the clamping member are each provided with an aperture adjacent the free end thereof and in which the leaf spring is provided at each end with a tongue adapted to fit into one of the apertures in the clamping means.

5. Clamping means as claimed in claim 4 in which the leaf spring is provided intermediate its ends with at least one bight portion which will bear against said other side of the frame member.

* * * * *